United States Patent
Agrawal et al.

(10) Patent No.: US 7,164,557 B2
(45) Date of Patent: Jan. 16, 2007

(54) APPARATUS FOR BURNISHING SMALL ASPERITIES AND CLEANING LOOSE PARTICLES FROM MAGNETIC RECORDING MEDIA

(75) Inventors: Parul Agrawal, Saratoga, CA (US); Hang Fai Ngo, San Jose, CA (US); Charles Lee, San Jose, CA (US); Li-Chung Lee, Saratoga, CA (US); Ullal Vasant Nayak, San Jose, CA (US); Stephen Olson, Palo Alto, CA (US); Robert N. Payne, San Jose, CA (US); Christopher Ramm, San Jose, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 443 days.

(21) Appl. No.: 10/784,506

(22) Filed: Feb. 23, 2004

(65) Prior Publication Data

US 2005/0185343 A1    Aug. 25, 2005

(51) Int. Cl.
*G11B 5/60*    (2006.01)
(52) U.S. Cl. .................. 360/236.2; 360/236.4; 360/236.5; 360/236.9; 360/237
(58) Field of Classification Search ............. 360/236.2, 360/236.9, 237.1
See application file for complete search history.

(56) References Cited

U.S. PATENT DOCUMENTS

| 4,845,816 A | | 7/1989 | Nanis |
|---|---|---|---|
| 5,063,712 A | | 11/1991 | Hamilton |
| 5,870,250 A | * | 2/1999 | Bolasna et al. .......... 360/236.8 |
| 5,991,118 A | * | 11/1999 | Kasamatsu et al. ...... 360/236.6 |
| 6,021,024 A | * | 2/2000 | Akiyama et al. ........ 360/236.8 |
| 6,230,380 B1 | | 5/2001 | Wang et al. |
| 6,249,945 B1 | | 6/2001 | Lee |
| 6,273,793 B1 | | 8/2001 | Liners et al. |
| 6,357,095 B1 | | 3/2002 | Duan et al. |
| 6,497,021 B1 | | 12/2002 | Lee et al. |
| 6,503,132 B1 | | 1/2003 | Ekstrum et al. |
| 2002/0031987 A1 | | 3/2002 | Liners et al. |

FOREIGN PATENT DOCUMENTS

EP    0231625 A1    12/1986

(Continued)

OTHER PUBLICATIONS

IBM Technical Disclosure Bulletin, pp. 2953-2954, "Disk Burnishing Head Design for High Performance Disk Files", Nov. 1983.

(Continued)

*Primary Examiner*—A. J. Heinz
(74) *Attorney, Agent, or Firm*—Bracewell & Giuliani LLP (57) ABSTRACT

An air bearing burnish slider burnishes very small asperities and cleans the loose particles that adhere to the magnetic recording media. The slider applies a controllable contact force to effectively burnish disk asperities or partially attached particles. In addition, the slider cleans the loose particles effectively while flying in a stable fashion. In a low pitch design, diagonal rails push particles away from the disk surface and trailing edge pads contact the disk at lower linear velocities. Rail pads retain loose contamination and debris in their pockets and burnish asperities. Another design provides a milder burnish force and flies in a high pitch configuration. The trailing edge pads provide stable contacts and the rails help in sweeping away debris. In both designs, the contact forces can be controlled by adjusting linear velocities. A step taper at the leading edge provides a pitch-producing lift force.

20 Claims, 6 Drawing Sheets

FOREIGN PATENT DOCUMENTS

| | | |
|---|---|---|
| EP | 427612 | 5/1991 |
| JP | 58-141430 | 9/1983 |
| JP | 59001163 | 1/1984 |
| JP | 59081058 | 5/1984 |
| JP | 62015074 | 1/1987 |
| JP | 62044371 | 2/1987 |
| JP | 10293922 | 11/1998 |
| JP | 2000-242922 | 9/2000 |
| JP | 2003030824 | 1/2003 |

OTHER PUBLICATIONS

IBM Technical Disclosure Bulletin, pp. 436-437, "Disk Burnishing Head Design for High Performance Disk Files", Aug. 1991.

* cited by examiner

APPARATUS FOR BURNISHING SMALL ASPERITIES AND CLEANING LOOSE PARTICLES FROM MAGNETIC RECORDING MEDIA

BACKGROUND OF THE INVENTION

1. Technical Field

The present invention relates in general to an improved burnishing slider and, in particular, to an improved system, method, and apparatus for burnishing very small asperities and cleaning the loose particles adhering to magnetic recording media.

2. Description of the Related Art

Data access and storage systems typically comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand revolutions per minute. Hard disk drives have several different typical standard sizes or formats, including server, desktop, mobile, and microdrive.

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

As the recording density of storage media increases, the substrates for media disks are getting smoother. The media disks typically have magnetic structures, lubricant layers, and an overcoat, all of which are all getting thinner with respect to the prior art. The qualification glide height is decreasing but fly heights are also decreasing to below 10 nm. It becomes very important for the reliability of the media that the disks are burnished effectively and that all the loose particles, ranging from approximately 10 nm to 500 nm, are removed from the surface along with the asperities.

In the past, there have been burnish slider designs having waffle, triangular, and diamond shape air bearing features that were designed to be in contact with the disk and burnish the asperities. There also have been traditional, two-rail slider designs that are effective in removing loose particles. The waffle, triangular, and diamond pad burnish slider designs were suitable for disks with high roughness. However, for very smooth disks, the contact force applied by these designs is very high and can cause damage to the disks. Two-rail slider designs are very efficient in removing larger particles but they cannot effectively burnish smaller asperities. All the above-mentioned sliders were fabricated by traditional machining processes. Machining is less desirable due to loose tolerances inherent in the process, and due to the generation of machined particles that can cause contamination problems.

Recently, some manufacturers have started utilizing a reactive ion etching (RIE) process. This category includes sliders with oval pads, oval and rectangular channel-like designs, and hybrid burnish head designs. The oval pad designs were found to be unstable in the contact mode. The hybrid slider design concept does not address the magnitude or the control of the contact forces. Thus, an improved air bearing burnish slider that can both burnish very small asperities and clean the loose particles adhering to magnetic recording media would be desirable.

SUMMARY OF THE INVENTION

A system, method, and apparatus for an air bearing burnish slider burnishes very small asperities and cleans the loose particles that adhere to the magnetic recording media. The present invention enables both cleaning and burnish action with the same slider. The slider performs two functions by (1) applying a controllable contact force in order to effectively burnish disk asperities or partially attached particles; and (2) cleaning the loose particles effectively while flying in a stable fashion. Both the contact force and the fly height of the slider may be controlled by changing the linear velocity of the disk.

In one embodiment, the design utilizes diagonally skewed rails that push the particles away from the media surface. The trailing edge employs pads that are in contact with the disk when the head is flying at lower linear velocities. The head is designed to fly in a low pitch configuration. The fly height and the magnitude of the trailing edge contact force can be controlled by controlling the linear velocity or suspension gram load. The rails also have pads attached to them, which serve to retain loose contamination and debris in their pockets. The rail pads also help in burnishing asperities. The design has a step taper at the leading edge to provide a pitch-producing lift force.

This embodiment of the air bearing has three diagonal rails, including a middle rail that extends from the leading edge to the trailing edge, and two adjacent side rails. The function of these skewed rails is to sweep the particles away from the disk surface towards the outer diameter edge. The angle of the rails can be changed depending upon the desired flying characteristics.

All three rails are terminated with leading and trailing edge pads. The leading edge pads have a shallow step taper that is created by ion milling. These leading edge pads with shallow step tapers provide some of the lift and the positive pitch to the slider. The trailing edge pads provide contact with the disk when the linear velocity is lower than a threshold limit. The trailing edge pads also help in reducing the dynamic roll. The smaller middle pads at the trailing edge provide a more uniform and mild contact pressure distribution.

The rails also have serrated, blade-like features in the middle. These features act like knives to cut the asperities and provide pockets for depositing the loose particles that collect from the disk surface. The rails are formed using a reactive ion milling process and are etched at a depth of approximately 15 µm.

In another embodiment, an improved hybrid design includes three rails that extend from the leading edge to provide the air bearing lift forces. Pitch is again provided by a leading edge step taper, and pads located at the trailing edge provide a soft contact. This is a high pitch design where particles will not be blocked by the leading edge, however, they will be swept by the rails. As with the previous embodiment, the contact force is a function of linear velocity but in this case the contact force increases more gradually as velocity decreases. The slider flies until a threshold linear velocity is reached and then touches down gently at the disk surface. The shape of the rails is designed in such a way to sweep the loose contamination and particles to the side.

This embodiment of the slider may be used to sweep away larger particles when flying above a threshold velocity. The slider side rails are swept back toward the outside edges of the slider from the leading edge to the trailing edge in a delta-like configuration. This shape acts to sweep any particles away from the active area of the disk surface as the slider passes. In a sweeping motion from the disk's inner diameter to the disk's outer diameter, the particles are swept toward the outer diameter and off the operating region of the disk.

This slider also employs RIE and ion milling processes. Lift at the leading edge is by means of a step taper, as described above. The three center rails provide the bulk of the lift and may be adjusted to control the velocity curves. The trailing edge pads provide some lift during flying and enter into contact with the disk during burnishing. The number and configuration of these pads may be changed to fine tune the design or to enhance the burnishing process.

These sliders are designed so that they can be used in the flying mode over the magnetic media at an operating range of approximately 12 to 15 m/s (linear velocity) to sweep away the particles. After sweeping, a glide test can be performed on the media at the required glide height. If the media surface has asperities that need to be eliminated, the same burnish head can be used to contact the disk at a lower linear velocity at the location of the asperities (which would be registered during the glide test). This process will improve media quality as the contact burnish process can be utilized specifically at the location of the asperities instead of over the entire surface of the disk.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
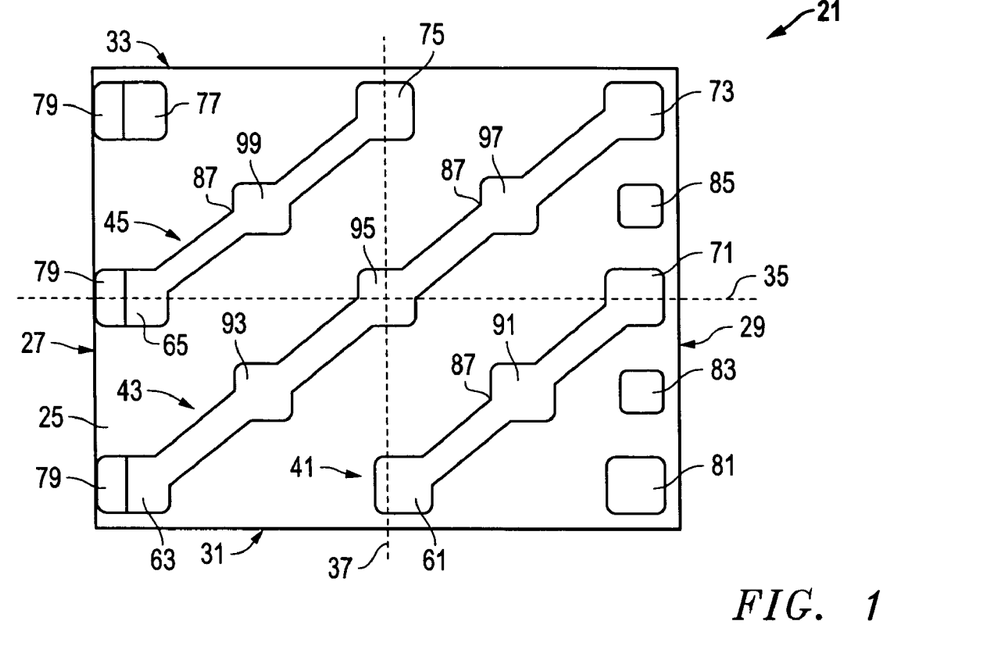
FIG. 1 is a top plan view of one embodiment of a burnish and cleaning slider constructed in accordance with the present invention.
Figure 11:
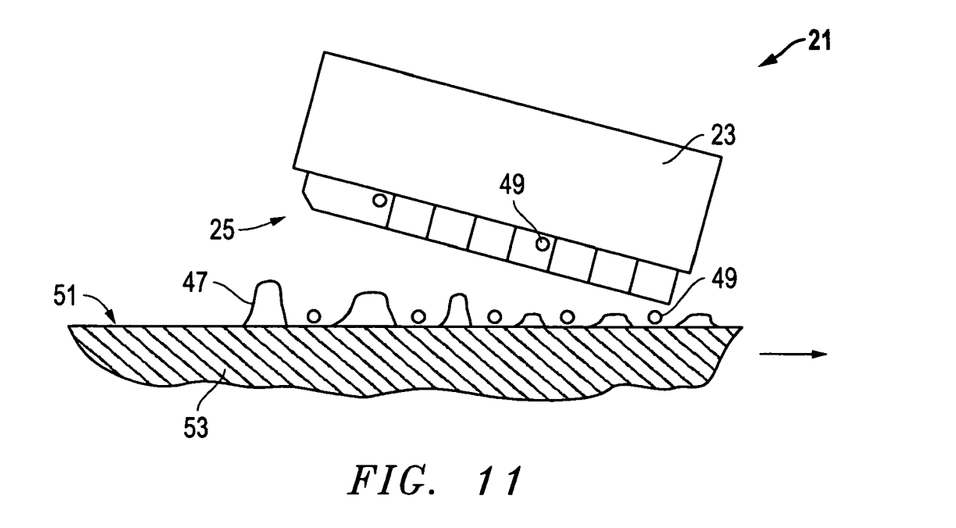
FIG. 11 is a sectional side view of the slider of FIG. 1 in operation burnishing and cleaning a media surface.

Referring to FIG. 1, one embodiment of a system, method, and apparatus for both burnishing asperities and cleaning loose particles from the surface of media, such as a magnetic recording media or disk, is shown. The primary instrument employed by the present invention is a slider 21. The slider 21 comprises a generally rectangular body 23 (FIG. 11) having an air bearing surface 25. The air bearing surface 25 includes a leading edge 27, a trailing edge 29, an inner edge 31, and an outer edge 33. The inner and outer edges 31, 33 correspond to the inner and outer diameters of the disk, which is being processed by slider 21. The inner and outer edges 31, 33 extend between the leading and trailing edges 27, 29 and define a longitudinal axis 35. A lateral axis 37 is perpendicular to the longitudinal axis 35 and extends between the inner and outer edges 31, 33.

The air being surface 25 of the slider 21 also has a plurality of rails. In the embodiment shown, slider 21 has three parallel rails 41, 43, 45, although it could have more or fewer rails, and they could be configured in many different styles and orientations. Each of the rails 41, 43, 45 is oriented at an acute angle (approximately 38 degrees, in FIG. 1) with respect to the longitudinal axis 35 such that the rails are defined as diagonal relative thereto. The angle can be modified based on flying requirements. The rails 41, 43, 45 are adapted to burnish asperities 47 (FIG. 11) and push loose particles 49 away from a surface 51 of the magnetic recording media 53. The rails are formed at a height of approximately 15 µm in one version.

Each of the rails 41, 43, 45 has an inner portion 61, 63, 65, respectively, that is closer to the inner edge 31 and an outer portion 71, 73, 75, respectively, that is closer to the outer edge 33. In addition, the inner portions 61, 63, 65 are closer to the leading edge 27 than respective ones of the outer portions 71, 73, 75. Moreover, all portions of the rails 41, 43, 45 terminate before reaching the perimeters of the various edges 27, 29, 31, 33.

The inner portion 61 of rail 41 is located approximately adjacent to a midpoint of the inner edge 31. Rail 41 extends from there to outer portion 71 (which is also a trailing edge pad), and which is located approximately adjacent to a midpoint of the trailing edge 29. The inner portion 63 (which is also a leading edge pad) of rail 43 (i.e., the middle rail) is located approximately adjacent to the intersection of the inner edge 31 and the leading edge 27. Rail 43 extends from there to outer portion 73 (which is also a trailing edge pad), and which is located approximately adjacent to the intersection of the trailing edge 29 and outer edge 33. The inner portion 65 (which is also a leading edge pad) of rail 45 is located approximately adjacent to a midpoint of the leading edge 27. Rail 45 extends from there to outer portion 75, which is located approximately adjacent to a midpoint of the outer edge 33.

Air bearing 25 further comprises at least one leading edge pad 77 that is independent of the rails 41, 43, 45. In the present embodiment, the leading edge pad 77 is located adjacent to an outer area of the leading edge 27 (i.e., adjacent to the corner of the intersection of leading edge 27 and outer edge 33). The leading edge pad 77 is congruent with at least one (two, in the embodiment shown) of the inner portions 63, 65 of the rails 43, 45, such that they share substantially the same geometry. In addition, the leading edge pad 77 and the two inner portions 63, 65 each have a step taper 79 to provide a pitch-producing lift force for the slider 21.

Located adjacent to the trailing edge 29 of the air bearing 25 is at least one (three shown) trailing edge pad 81 that is independent of the rails 41, 43, 45. The trailing edge pad 81 is congruent with the outer portions 71, 73 of the rails. Two of the trailing edge pads 83, 85 are smaller in size than the first trailing edge pad 81. In one embodiment, trailing edge pad 81 is located adjacent to the corner at the intersection of inner edge 31 and trailing edge 29, pad 83 is located between pad 81 and outer portion 71, and pad 85 is located between outer portion 71 and outer portion 73.

Each of the rails 41, 43, 45 has at least one rail pad that defines pockets 87 for the various rails. For example, rail 41 has a single rail pad 91, rail 43 has three rail pads 93, 95, 97, and rail 45 has a single rail pad 99 like rail pad 91. The rail pads 91, 93, 95, 97, 99 are generally rectangular with rounded edges (as are the inner and outer portions of the rails), and are adapted to retain loose particles 49 (FIG. 11) in the pockets thereof and burnish the asperities 47. The edges are rounded off to avoid scratching.

In the embodiment shown, the rail pads are symmetrically disposed with respect to their respective rails and with respect to the other elements formed on air bearing 25. In other words, all of the pads on all of the rails are congruent, and all of the pads align in longitudinal and lateral directions. For example, the following sets of pads align in the lateral direction, such that they form five separate "rows:" pads 63, 65, 77; pads 93, 99; pads 61, 95, 75; pads 91, 97; and pads 81, 83, 71, 85, 73. In addition, the following sets of pads align in the longitudinal direction, such that they form five separate "columns:" pads 63, 61, 81; pads 93, 91, 83; pads 65, 95, 71; pads 99, 97, 85; and pads 77, 75, 73.

Figure 3:
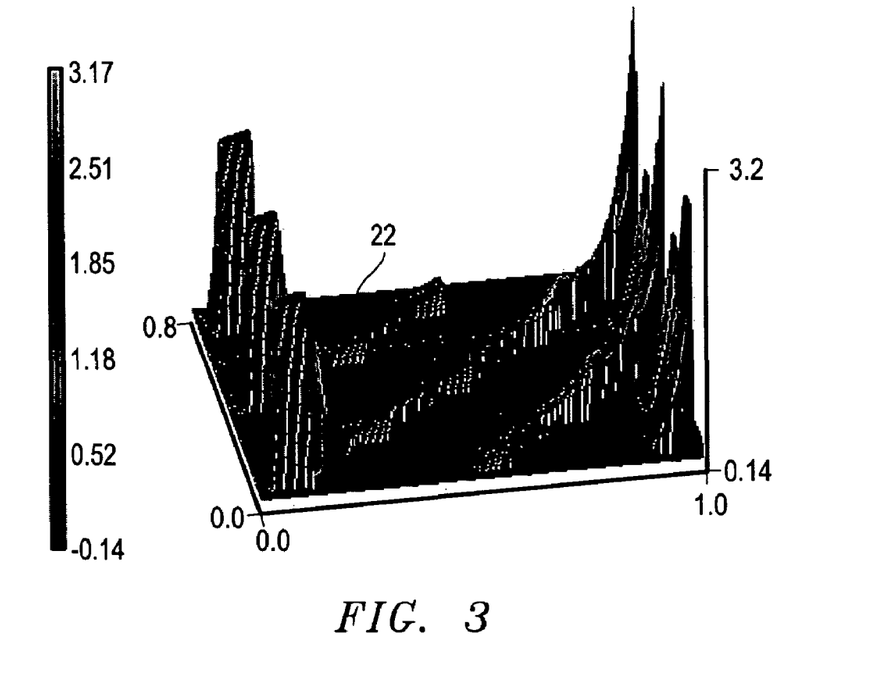
FIG. 3 is a three-dimensional representation of the air pressure distribution for the slider of FIG. 1.

The air pressure distribution on the slider 21 is shown in FIG. 3 as plot 22. Although the analysis is performed for a nano-sized slider (approximately 2.0×1.6 mm2), the design can also be used for a pico-sized slider (1.25×1.0 mm2). From air bearing modeling it can be seen that the slider 21 is a low pitch design. The low pitch is designed to impede particles from entering the leading edge 27.

Figure 4:
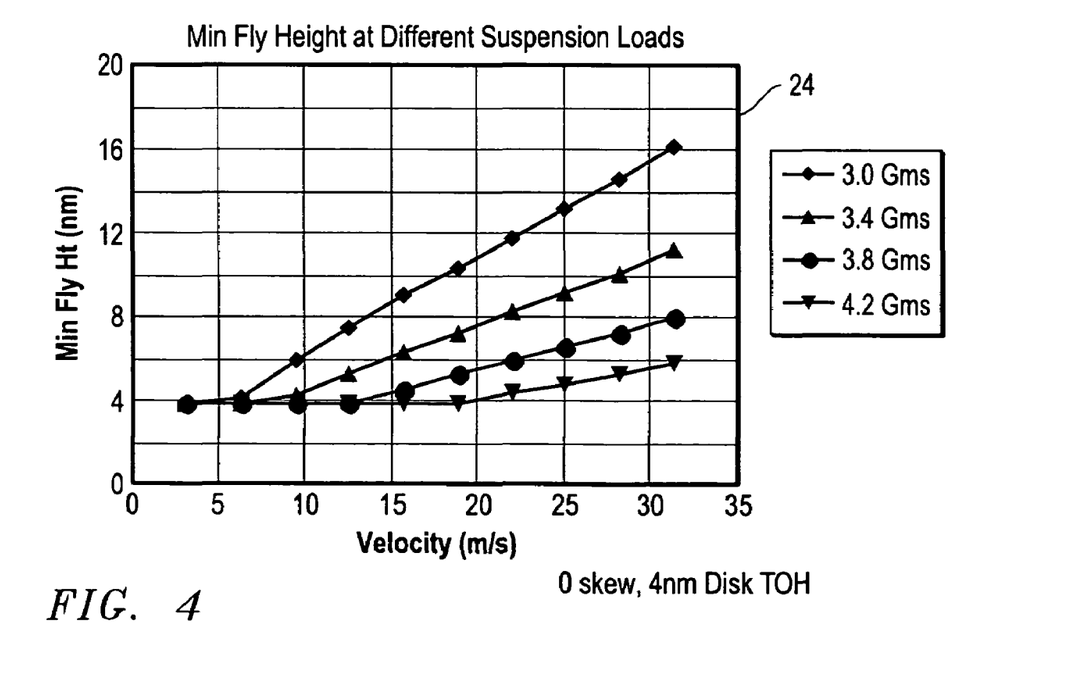
FIG. 4 is a plot of the fly height of the slider of FIG. 1 at different velocities and gram loads.
Figure 5:
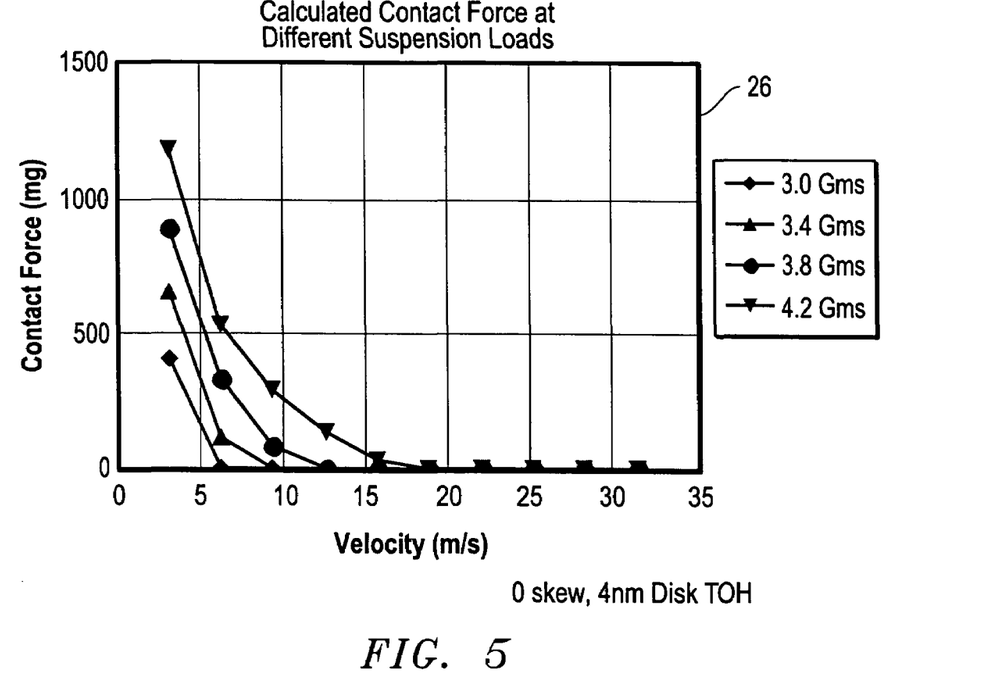
FIG. 5 is a plot of the contact load of the slider of FIG. 1 at different velocities and gram loads.
Figure 6:
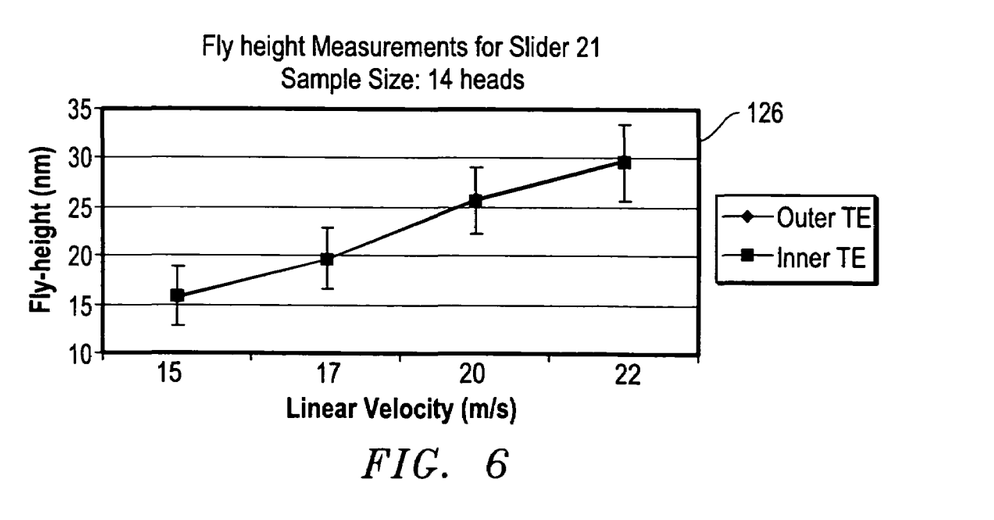
FIG. 6 is a plot of fly height measurements of the slider of FIG. 1.

The fly height and contact force measurements for slider 21 are shown in FIGS. 4 and 5 as plots 24 and 26, respectively. The fly height is a function of both linear velocity and suspension gram load. Fly height is inversely proportional to gram load, whereas contact force is directly proportional to gram load. The magnitude of the contact can be adjusted by the suspension gram load. The fly height measurements at the trailing edge are shown as plot 126 in FIG. 6. The values match the model prediction at the operating linear velocity of 15 m/s.

Figure 2:
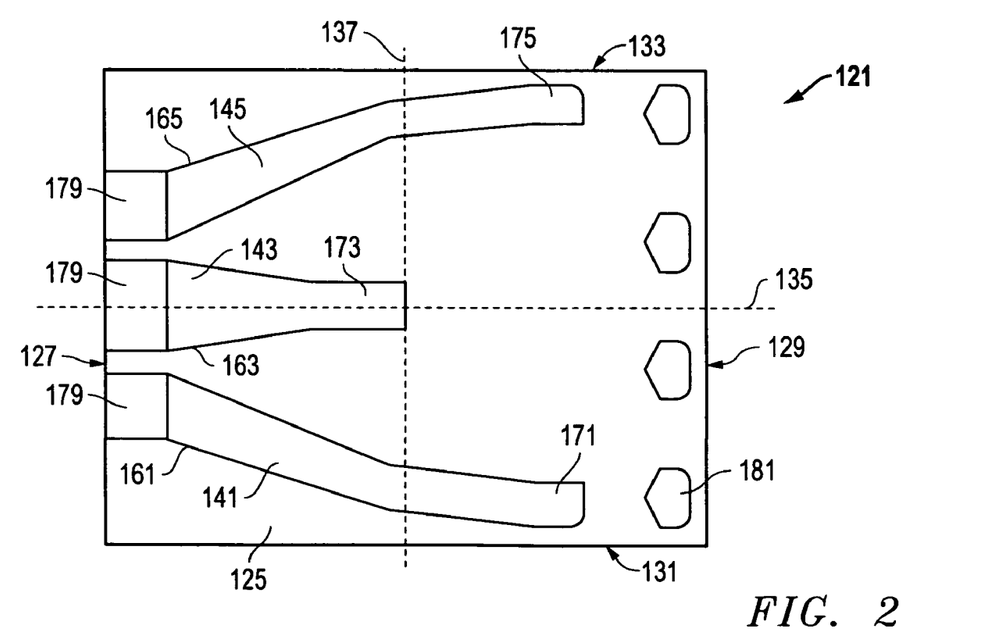
FIG. 2 is a top plan view of another embodiment of a burnish and cleaning slider constructed in accordance with the present invention.

Referring now to FIG. 2, another embodiment of a slider 121 for burnishing asperities and cleaning loose particles that adhere to magnetic recording media is shown. Like slider 21, slider 121 has an air bearing surface 125 with a leading edge 127, a trailing edge 129, an inner edge 131, an outer edge 133, a longitudinal axis 135, and a lateral axis 137. However, the geometry of the components protruding from the surface of slider 121 differ from those of slider 21. For example, the illustrated embodiment of slider 121 has a central rail 143 that is aligned with the longitudinal axis 135. The central rail 143 has a leading portion 163 located adjacent to the leading edge 127, and a trailing portion 173 that terminates approximately at a midpoint of both the longitudinal and lateral axes 135, 137. In addition, a leading edge step taper 179 is formed on each of the leading portions 161, 163, 165 of the side and central rails 141, 143, 145, respectively.

Slider 121 also has a pair of side rails 141, 145 that are symmetrically arrayed about the longitudinal axis 135 and the central rail 143. Each of the side rails 141, 145 has a leading portion 161, 165, respectively, located adjacent to the leading edge 127, and a trailing portion 171, 175, respectively, that extend away from the central rail 143. Moreover, the leading portions 161, 165 are spaced away from the inner and outer edges 131, 133, respectively, such that they are located closer to the central rail 143. The leading portions 161, 163, 165 of the central and side rails 141, 143, 145, respectively, are wider in a lateral direction than their respective trailing portions 171, 173, 175. In the embodiment shown, each of the side and central rails 141, 143, 145 is octagonal in shape, with the outer trailing corners of the side rails 141, 145 being rounded. Furthermore, the side rails 141, 145 are swept back toward the inner and outer edges 131, 133, respectively, in a delta-like configuration.

The slider 121 also has a set of trailing pads 181 (four shown) located adjacent to the trailing edge 129. The trailing pads 181 are symmetrically arrayed along the trailing edge 129, and each of the trailing pads 181 is generally pentagonal in shape with rounded trailing edges.

Figure 7:
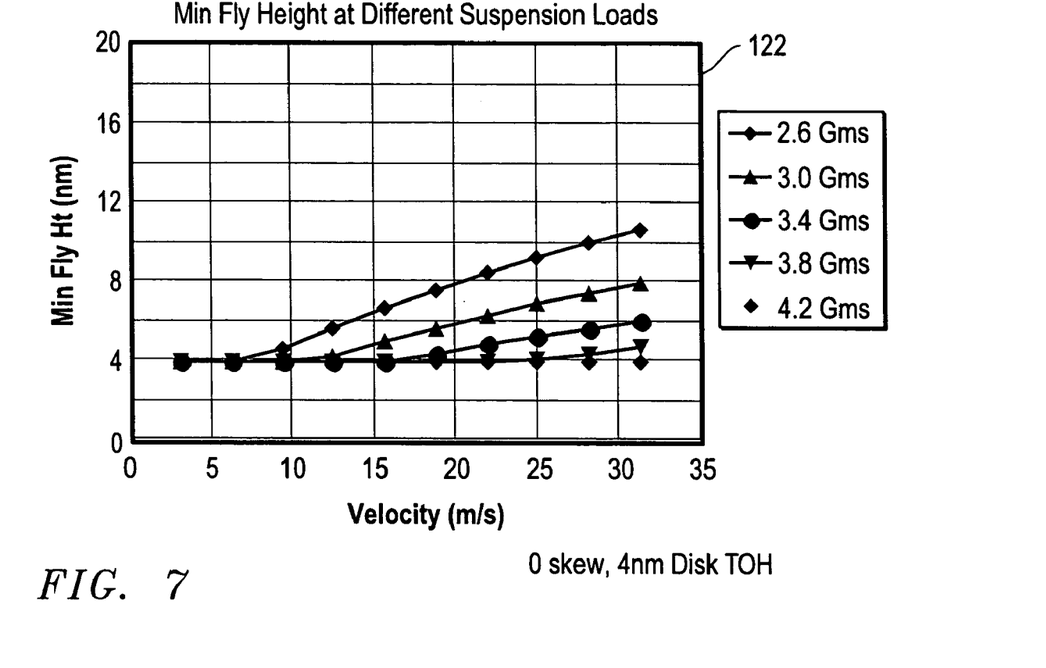
FIG. 7 is a plot of the fly height of the slider of FIG. 2 at different velocities and gram loads.
Figure 8:
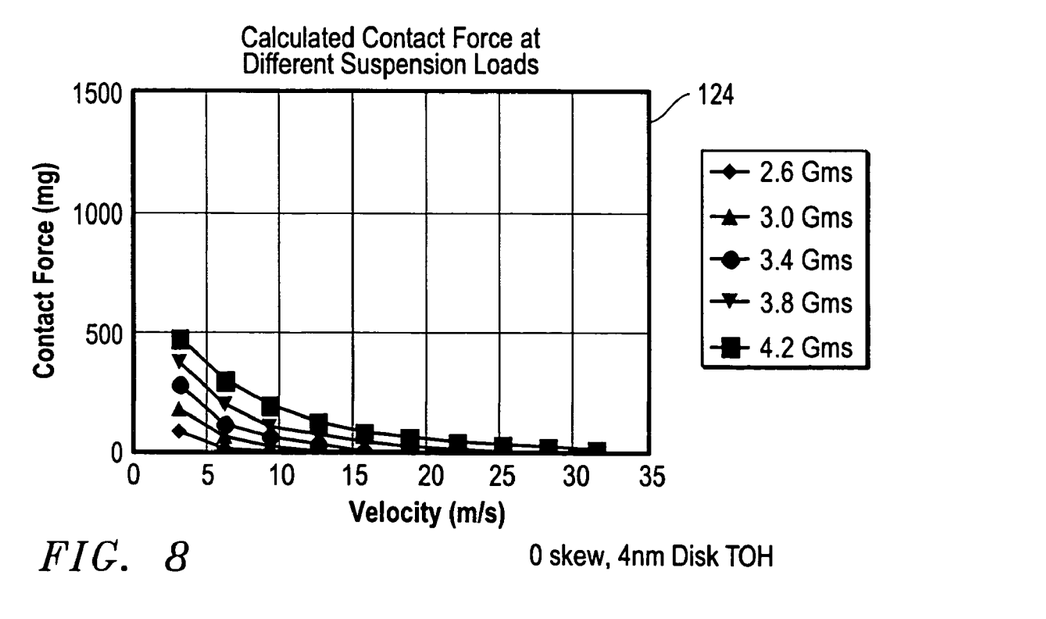
FIG. 8 is a plot of the contact load of the slider of FIG. 2 at different velocities and gram loads.
Figure 9:
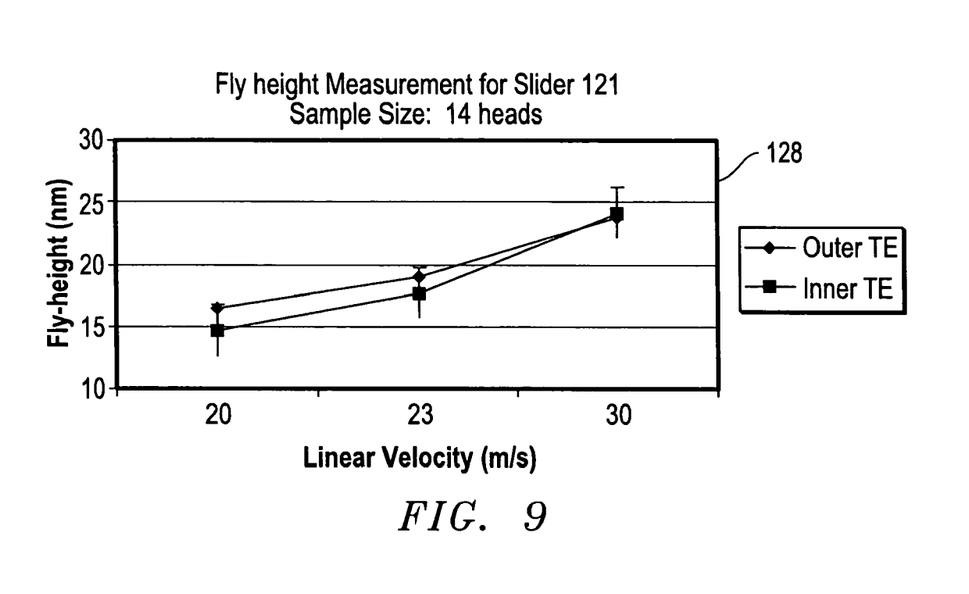
FIG. 9 is a plot of fly height measurements of the slider of FIG. 2.

Below the threshold velocity, the slider 121 enters into contact with the disk, as described above for the previous embodiment. The fly height and magnitude of the contact force can be controlled by the velocity, as shown in plots 122, 124 in FIGS. 7 and 8, respectively. The contact force increases gradually with a decrease in velocity, allowing for fine adjustments in the magnitude of the contact force. The contact force of the BRI slider may also be offset adjusted by changing the gram load while still retaining the fine adjustability via a change in the velocity. The fly height measurements at the trailing edge are shown as plot 128 in FIG. 9. The values match the model prediction at the operating linear velocity of 15 m/s.

Figure 10:
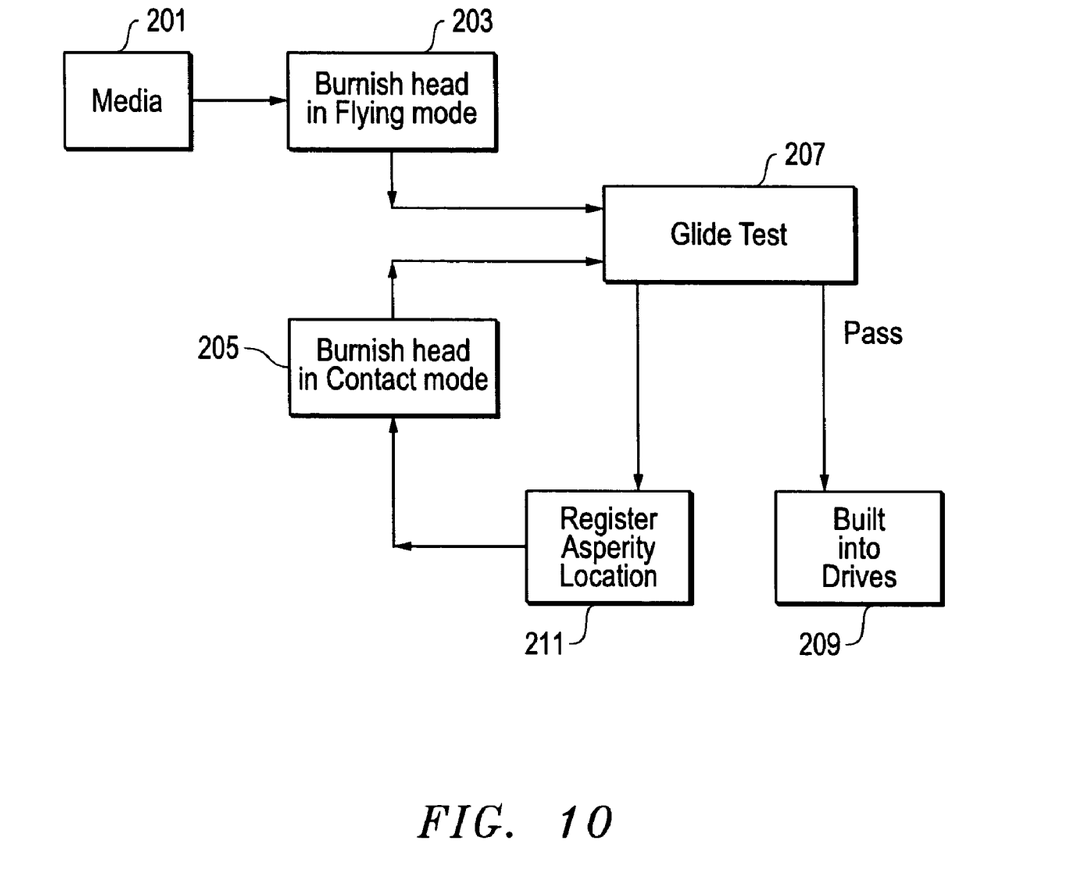
FIG. 10 is a block diagram for a method of utilizing the sliders of FIGS. 1 and 2.

The present invention also comprises a system and method of burnishing asperities and removing particles from the surface of media. A block diagram of this process is shown in FIG. 10. A media, such as magnetic recording media, is represented at block 201. As depicted at block 203, the slider is flown adjacent to the rotatable media, which has asperities and/or particles. A controllable contact force is applied by the slider relative to the media surface to burnish the asperities and clean the particles that are loose or partially attached to the media while flying the slider in a stable fashion. As illustrated at block 205, a contact force of the slider relative to the media surface and a fly height of the slider is controlled by changing a linear velocity of the media, such that the contact force increases gradually with a decrease in velocity, allowing for fine adjustments in a magnitude of the contact force.

The method may further comprise contacting the media with trailing edge pads on the slider when the linear velocity is lower than a threshold velocity, and sweeping away larger particles when flying above the threshold velocity. In addition, a dynamic roll of the slider is reduced with the trailing edge pads, and smaller middle trailing edge pads provide for a more uniform and mild contact pressure distribution. The trailing edge pads also provide some lift during flying, in addition to burnishing contact with the media.

Furthermore, the slider may be flown in a low pitch configuration relative to the media, and the slider provided with pads having pockets for retaining loose contamination and debris in the pockets. Moreover, the pads themselves can be used to burnish asperities. The method may provide a pitch-producing lift force with a step taper located at a leading edge of the slider. The method can adjust the contact force of the slider by changing the gram load while still retaining the fine adjustability via a change in the velocity. As illustrated at block 207, a glide test is administered after burnishing and cleaning to test the media at a required glide height. If the media passes the glide test, the media is built into an end product (block 209). If not, the asperity or particle location is registered (block 211) and the burnishing/cleaning process is repeated.

The present invention has several advantages over existing burnish heads. On very smooth media, prior art sliders can either be in very aggressive contact (e.g., waffle designs), or they can fly too high (e.g., conventional two-rail slider designs). Such aggressive contact has the potential to damage the disk, especially in case of Al/Mg substrates, and conventional two-rail flying sliders are not stable during disk contact, hence, cannot burnish the asperities or remove very small particles. Therefore, these prior art designs cannot be used to burnish asperities or remove very small sized particles.

The air bearing slider designs of the present invention is capable of flying as well as maintaining stable contact on the media. Both the flying and contact states are controlled by varying the operating linear velocity of the disk. These designs also make use of reactive ion etching and ion-milling processes that have a number of advantages when compared to conventional machining processes. Since the etching process is more precise, it helps achieve the design specifications and tolerances. This process is also cleaner, so it helps eliminate prior art problems such as chipping, cracking, and other machining-related defects. These new designs also utilize an ion milled step taper at the leading edge that helps minimize the chance of embedding particles due to the ramp-type of taper produced by the machining process.

While the invention has been shown or described in only some of its forms, it should be apparent to those skilled in the art that it is not so limited, but is susceptible to various changes without departing from the scope of the invention.

What is claimed is:

1. A slider for burnishing asperities and cleaning loose particles that adhere to magnetic recording media, the slider comprising:

a body having an air bearing surface including a leading edge, a trailing edge, an inner edge, and an outer edge, the inner and outer edges extending between the leading and trailing edges and defining a longitudinal axis, and a lateral axis perpendicular to the longitudinal axis that extends between the inner and outer edges;

a plurality of rails on the air bearing surface, each of the rails being oriented at an acute angle with respect to the longitudinal axis such that the rails are defined as diagonal relative thereto, the rails being adapted to push the loose particles away from a surface of the magnetic recording media;

each of the rails having an inner portion that is closer to the inner edge and an outer portion that is closer to the outer edge, and the inner portions being closer to the leading edge than respective ones of the outer portions; and at least one leading edge pad that is independent of the rails and located adjacent to an outer area of the leading edge.

2. The slider of claim 1, wherein one of the rails is a middle rail with the inner portion of the middle rail being a leading edge pad, the outer portion of the middle rail is a trailing edge pad, and three additional rail pads are symmetrically disposed between the leading and trailing edge pads of the middle rail, and wherein all of the pads are generally rectangular in shape with rounded edges.

3. The slider of claim 1, wherein said at least one leading edge pad is congruent with at least one of the inner portions of the rails.

4. The slider of claim 1, wherein said at least one leading edge pad and at least one of the inner portions of the rails have a step taper to provide a pitch-producing lift force for the slider.

5. The slider of claim 1, further comprising at least one trailing edge pad that is independent of the rails and located adjacent to the trailing edge.

6. The slider of claim 5, wherein said at least one trailing edge pad comprises three trailing edge pads, with a first trailing edge pad being congruent with the outer portions of the rails, and two of the trailing edge pads being smaller in size than the first trailing edge pad.

7. The slider of claim 1, further comprising at least one rail pad on each of the rails, the rail pads defining pockets, and the rail pads being adapted to retain loose particles in the pockets thereof and burnish asperities.

8. The slider of claim 1, wherein the inner portion of an inner rail extends from approximately a midpoint of the inner edge to approximately a midpoint of the trailing edge, and an inner portion of an outer rail extends from approximately a midpoint of the leading edge to approximately a midpoint of the outer edge.

9. The slider of claim 8, wherein the inner and outer rails are equal in length, and each has a single rail pad that is symmetrically disposed between the respective inner and outer portions thereof.

10. The slider of claim 9, wherein all of the inner portions, outer portions, and pads align to define longitudinal columns and lateral rows.

11. A slider for burnishing asperities and cleaning loose particles that adhere to magnetic recording media, the slider comprising:

a body having an air bearing surface including a leading edge, a trailing edge, an inner edge, and an outer edge, the inner and outer edges extending between the leading and trailing edges and defining a longitudinal axis, and a lateral axis perpendicular to the longitudinal axis that extends between the inner and outer edges;

a plurality of rails on the air bearing surface, each of the rails being oriented at an acute angle with respect to the longitudinal axis such that the rails are defined as diagonal relative thereto, the rails being adapted to push the loose particles away from a surface of the magnetic recording media;

each of the rails having an inner portion that is closer to the inner edge and an outer portion that is closer to the outer edge, and the inner portions being closer to the leading edge than respective ones of the outer portions; and at least one rail pad on each of the rails, the rail pads defining pockets, and the rail pads being adapted to retain loose particles in the pockets thereof and burnish asperities.

12. The slider of claim 11, further comprising at least one leading edge pad that is independent of the rails and located adjacent to an outer area of the leading edge, and wherein said at least one leading edge pad is congruent with at least one of the inner portions of the rails, and said at least one leading edge pad and at least one of the inner portions of the rails have a step taper to provide a pitch-producing lift force for the slider.

13. The slider of claim 11, further comprising at least one trailing edge pad that is independent of the rails and located adjacent to the trailing edge, and wherein said at least one trailing edge pad comprises three trailing edge pads, with a first trailing edge pad being congruent with the outer portions of the rails, and two of the trailing edge pads being smaller in size than the first trailing edge pad.

14. The slider of claim 11, wherein one of the rails is a middle rail that extends from an inner area of the leading edge to an outer area of the trailing edge, and wherein the inner portion of the middle rail is a leading edge pad, the outer portion of the middle rail is a trailing edge pad, and three additional rail pads are symmetrically disposed between the leading and trailing edge pads of the middle rail, and wherein all of the pads are generally rectangular in shape with rounded edges.

15. The slider of claim 11, wherein the inner portion of an inner rail extends from approximately a midpoint of the inner edge to approximately a midpoint of the trailing edge, and an inner portion of an outer rail extends from approximately a midpoint of the leading edge to approximately a midpoint of the outer edge; wherein the inner and outer rails are equal in length, and each has a single rail pad that is symmetrically disposed between the respective inner and outer portions thereof; and wherein all of the inner portions, outer portions, and pads align to define longitudinal columns and lateral rows.

16. A slider for burnishing asperities and cleaning loose particles that adhere to magnetic recording media, the slider comprising:

a body having an air bearing surface including a leading edge, a trailing edge, an inner edge, and an outer edge, the inner and outer edges extending between the leading and trailing edges and defining a longitudinal axis, and a lateral axis perpendicular to the longitudinal axis that extends between the inner and outer edges;

a plurality of rails on the air bearing surface, each of the rails being oriented at an acute angle with respect to the longitudinal axis such that the rails are defined as diagonal relative thereto, the rails being adapted to push the loose particles away from a surface of the magnetic recording media;

each of the rails having an inner portion that is closer to the inner edge and an outer portion that is closer to the outer edge, and the inner portions being closer to the leading edge than respective ones of the outer portions; and at least one trailing edge pad that is independent of the rails and located adjacent to the trailing edge.

17. The slider of claim 16, further comprising at least one leading edge pad that is independent of the rails and located adjacent to an outer area of the leading edge, wherein said at least one leading edge pad is congruent with at least one of the inner portions of the rails, and wherein said at least one leading edge pad and at least one of the inner portions of the rails have a step taper to provide a pitch-producing lift force for the slider.

18. The slider of claim 16, wherein said at least one trailing edge pad comprises three trailing edge pads, with a first trailing edge pad being congruent with the outer portions of the rails, and two of the trailing edge pads being smaller in size than the first trailing edge pad.

19. The slider of claim 16, wherein one of the rails is a middle rail that extends from an inner area of the leading edge to an outer area of the trailing edge, and wherein the inner portion of the middle rail is a leading edge pad, the outer portion of the middle rail is a trailing edge pad, and three additional rail pads are symmetrically disposed between the leading and trailing edge pads of the middle rail, and wherein all of the pads are generally rectangular in shape with rounded edges.

20. The slider of claim 16, wherein the inner portion of an inner rail extends from approximately a midpoint of the inner edge to approximately a midpoint of the trailing edge, and an inner portion of an outer rail extends from approximately a midpoint of the leading edge to approximately a midpoint of the outer edge, wherein the inner and outer rails are equal in length, and each has a single rail pad that is symmetrically disposed between the respective inner and outer portions thereof, and wherein all of the inner portions, outer portions, and pads align to define longitudinal columns and lateral rows.

* * * * *